United States Patent Office 3,076,703
Patented Feb. 5, 1963

3,076,703
MANUFACTURE OF STEEL
Paul Metz, Dudelange, Luxembourg, assignor to ARBED, Acieries Reunies de Burbach-Eich-Dudelange, Societe Anonyme, Luxembourg, Grand Duchy of Luxembourg
No Drawing. Filed Apr. 27, 1959, Ser. No. 808,864
Claims priority, application Luxembourg Apr. 28, 1958
3 Claims. (Cl. 75—52)

The preent invention relates to a method of manufacturing steel by the pneumatic refining of pig-iron and more particularly, though not exclusively, to a process in which the refining of the melt is accomplished by the injection of commercially pure oxygen holding finely divided materials in suspension from above.

When first introduced the process using the injection of oxygen from above gave promising results in the treatment of pig-iron low in phosphorus; and more recently, another process using the injection from above of oxygen holding dephosphorizing materials in suspension, has enabled the steel maker to obtain a steel of high and consistent quality from phosphoric pig-irons which formerly had been refined almost exclusively in the classical bottom-blown converter.

Compared with atmospheric air or even air enriched in oxygen, the use of commercially pure oxygen as a refining gas normally has a much more rapid and intense action, and this characteristic certainly constitutes a substantial advantage for the refining process proper in that the output per day of the steel plant is increased. However, this can give rise to certain disadvantages especially in the final stage of the refining operation. The steel maker is in effect normally obliged to finish the refining operation with the melt in a certain physical and chemical state especially in regard to temperature and carbon content. He should therefore have at his disposal at the end of the operation a means permitting him to control precisely the state of the melt. But the use of commercially pure oxygen with its rapid and intense action does not permit the steel maker to do this. If he desires, for example, to obtain at the end of the blowing operation a steel having a carbon content of 0.05% he must normally stop the operation when the melt contains rather more than 0.05% carbon. If he then tries to adjust the carbon content of the melt to the desired value by continuing with the blowing in of commercially pure oxygen, he runs the risk of over shooting the percentage required. In other words, the action of commercially pure oxygen is too quick to permit its use as a means of controlling the operation.

Moreover, when the blowing of oxygen is stopped either for an intermediate slagging operation or for the final slagging operation it is generally found that the metal and the slag are not in physical and chemical equilibrium. The impurity removing properties of the slag are not yet exhausted. This is especially noticeable in a process using oxygen with powdered dephosphorizing materials in suspension. If the melt and the slag are allowed to remain in the conversion apparatus, it is found that the dephosphorizing reaction continues to a substantial extent. However, to obtain this further dephosphorization, it is necessary to allow the melt to remain in the apparatus for a certain length of time and this is liable to reduce the output of the steel plant, and moreover the melt is liable to cool.

The present invention relates specifically to a process applicable to steel-making operations in which the refining is carried out by means of the blowing in of commercially pure oxygen possibly containing powdered materials in suspension, into or on to the melt. The process according to the invention provides a precise method of control at the end of the operation and enables a further dephosphorization to be carried out owing to the acceleration of the establishment of a final equilibrium between the slag and the metallic part of the melt.

The invention provides a process for the manufacture of steel by blowing commercially pure oxygen into or on to the melt, in which, immediately after the cessation of blowing for an intermediate or final slagging, a gas containing less than substantially 35% of free oxygen is blown into the melt to stir it, to accelerate reactions between the metal and the slag, and, in the case of a slagging at the end of the operation, to permit of a precise control of the physical and chemical properties of the molten metal and the slag.

If it is desired to stir up and homogenize the melt before an intermediate or final slagging, the gas blown in can be neutral or reducing, for example nitrogen, argon or carbon monoxide. For control of the melt at the end of the operation, and more particularly for the final dephosphorization, the gas used can be a gaseous mixture containing less than 35% of free oxygen such as air or air slightly enriched with oxygen, with steam, or with carbon dioxide. However, if the dephosphorization that is to be carried out in the final blowing is not considered to be very important, the use of a neutral or reducing gas also permits of a precise control at the end of the refining operation.

Though the period of blowing in of gas according to the invention obviously depends on the nature of the melt and the type of gas used, promising results have been obtained with the blowing in of the gas during periods ranging from 1 to 4 minutes.

The blowing in of gas to stir the melt can be carried out through any known blowing device, but it has been found especially satisfactory to use a blowing lance for blowing in oxygen for this purpose.

It is moreover provided, according to the invention, that in the case of the blowing in of oxygen holding powdered dephosphorizing materials in suspension the materials can be continued to be injected on to the melt by putting them in suspension in the gas used for stirring. This technique has been found to increase the efficacy of the stirring considerably.

The process according to the invention can be applied not only to converters with solid bottoms and to rotary furnaces but also to converters of the type having tuyères in the bottom through which a small quantity of oxidizing gas is blown into the melt. In this last case the converter can be tilted and the gas for stirring blown in from above.

The process described can also be carried out with an increased rate of feed of dephosphorizing materials for a period of 2 to 3 minutes immediately before the cessation of the blowing of oxidizing gas.

The process according to the invention also enables the steelmaker to control precisely the final temperature and final carbon content of the melt with a great degree of precision.

Moreover, the invention provides a means of reducing the phosphorus and sulphur content of the melt without any substantial increase in the iron content of the slag, and, in the case where air is used for stirring, without any increase in the nitrogen content.

The following example of the process according to the invention is now given for illustration only.

A converter with a solid bottom was charged with 20 tons of phosphorus-rich pig-iron which was refined by the injection from above of commercially pure oxygen holding finely divided lime in suspension. At the end of the operation it was desired to adjust the carbon content of the molten metal to 0.05%. For this, the injection of oxygen was stopped when the carbon content of the melt was still 0.080%. At this instant the iron content of the slag was 20.7% and the metal had a temperature of 1620° C. and contained 0.028% phosphorus, 0.018 sulphur, and 0.0032% nitrogen.

Air was then blown in for 2 minutes by means of a lance used in refining and immediately after this the molten metal contained 0.050% carbon, 0.016% phosphorus, 0.009% sulphur, 0.0030% nitrogen.

The temperature was now 1605° C. and the iron content of the slag was 21.7%.

I claim:

1. In the manufacture of steel which includes blowing pure oxygen into a melt of pig iron in order to dephosphorize said iron, in combination therewith the step stirring and further dephosphorizing of said melt after the blowing of oxygen is finished, but before a final slagging of the melt, by blowing into the melt an oxidizing gas containing less than substantially 35% free oxygen.

2. The process as set forth in claim 1 in which the oxidizing gas containing less than substantially 35% free oxygen is selected from the group comprising: air enriched with oxygen; air alone; air containing steam and added oxygen; air containing steam and added carbon dioxide and added oxygen.

3. The process as set forth in claim 2 in which the blowing into the melt of the oxidizing gas containing substantially less than 35% free oxygen lasts from 1 to 4 minutes.

References Cited in the file of this patent

UNITED STATES PATENTS

| | | |
|---|---|---|
| 2,789,406 | Speith et al. | Apr. 16, 1957 |
| 2,793,110 | Kosmider et al. | May 21, 1957 |

FOREIGN PATENTS

| | | |
|---|---|---|
| 758,707 | Great Britain | Oct. 10, 1956 |
| 787,098 | Great Britain | Dec. 4, 1957 |